United States Patent
Wang et al.

(10) Patent No.: US 11,962,564 B2
(45) Date of Patent: Apr. 16, 2024

(54) ANYCAST ADDRESS FOR NETWORK ADDRESS TRANSLATION AT EDGE

(71) Applicant: VMware LLC, Palo Alto, CA (US)

(72) Inventors: Yong Wang, Sunnyvale, CA (US); Xinhua Hong, Milpitas, CA (US); Kai-Wei Fan, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/672,190

(22) Filed: Feb. 15, 2022

(65) Prior Publication Data

US 2023/0262022 A1    Aug. 17, 2023

(51) Int. Cl.
*H04L 61/256* (2022.01)
*G06F 9/455* (2018.01)
(Continued)

(52) U.S. Cl.
CPC ........ *H04L 61/256* (2013.01); *G06F 9/45558* (2013.01); *H04L 45/24* (2013.01); *H04L 61/103* (2013.01); *H04L 61/2517* (2013.01); *G06F 2009/45595* (2013.01); *H04L 2101/622* (2022.05)

(58) Field of Classification Search
CPC . H04L 61/256; H04L 61/103; H04L 61/2517; H04L 45/24; G06F 9/45558; G06F 2009/45595
See application file for complete search history.

(56) References Cited

U.S. PATENT DOCUMENTS

| | | | |
|---|---|---|---|
| 5,204,966 | A | 4/1993 | Wittenberg et al. |
| 5,900,025 | A | 5/1999 | Sollars |

(Continued)

FOREIGN PATENT DOCUMENTS

| | | |
|---|---|---|
| CN | 101641912 A | 2/2010 |
| CN | 103181131 A | 6/2013 |

(Continued)

OTHER PUBLICATIONS

Liu et al., "CFN-dyncast: Load Balancing the Edges via the Network" IEEE Wireless Communications and etworking Conference Workshops, Mar. 20, 2021, IEEE Publishing.*

(Continued)

*Primary Examiner* — Todd L Barker
(74) *Attorney, Agent, or Firm* — Quarles & Brady LLP

(57) ABSTRACT

Some embodiments provide a method for forwarding data messages at multiple edge nodes of a logical network that process data messages between a logical network and an external network. At a particular one of the edge nodes, the method receives a data message sent from a source machine in the logical network. The method performs network address translation to translate a source network address of the data message corresponding to the source machine into an anycast network address that is shared among the edge nodes. The method sends the data message with the anycast network address as a source network address to the external network. Each edge node receives data messages from source machines in the logical network and translates the source addresses of the data messages into the same anycast public network address prior to sending the data messages to the external network.

21 Claims, 8 Drawing Sheets

(51) Int. Cl.
  *H04L 45/24* (2022.01)
  *H04L 61/103* (2022.01)
  *H04L 61/2517* (2022.01)
  *H04L 101/622* (2022.01)

(56) References Cited

U.S. PATENT DOCUMENTS

| | | | |
|---|---|---|---|
| 6,108,308 | A | 8/2000 | Flavin et al. |
| 6,687,245 | B2 | 2/2004 | Fangman et al. |
| 7,120,693 | B2 | 10/2006 | Chang et al. |
| 7,146,421 | B2 | 12/2006 | Syvanne |
| 7,277,401 | B2 | 10/2007 | Kyperountas et al. |
| 7,561,515 | B2 | 7/2009 | Ross |
| 7,724,670 | B2 | 5/2010 | Nilakantan et al. |
| 7,760,640 | B2 | 7/2010 | Brown et al. |
| 7,765,312 | B2 | 7/2010 | Monette et al. |
| 7,778,194 | B1 | 8/2010 | Yung |
| 7,818,452 | B2 | 10/2010 | Matthews et al. |
| 7,826,390 | B2 | 11/2010 | Noel et al. |
| 7,881,215 | B1 | 2/2011 | Daigle et al. |
| 7,948,986 | B1 | 5/2011 | Ghosh et al. |
| 8,005,770 | B2 | 8/2011 | Minh et al. |
| 8,190,767 | B1 | 5/2012 | Maufer et al. |
| 8,261,317 | B2 | 9/2012 | Litvin et al. |
| 8,300,532 | B1 | 10/2012 | Venkatramani et al. |
| 8,316,113 | B2 | 11/2012 | Linden et al. |
| 8,339,994 | B2 | 12/2012 | Gnanasekaran et al. |
| 8,369,323 | B1 | 2/2013 | Desai |
| 8,370,936 | B2 | 2/2013 | Zuk et al. |
| 8,553,552 | B2 | 10/2013 | Hu et al. |
| 8,625,426 | B2 | 1/2014 | Strulo et al. |
| 8,711,703 | B2 | 4/2014 | Allan et al. |
| 8,713,663 | B2 | 4/2014 | An |
| 8,737,221 | B1 | 5/2014 | Jilani et al. |
| 8,811,401 | B2 | 8/2014 | Stroud et al. |
| 8,830,834 | B2 | 9/2014 | Sharma et al. |
| 8,897,132 | B2 | 11/2014 | Feroz et al. |
| 8,937,865 | B1 | 1/2015 | Kumar et al. |
| 8,942,238 | B2 | 1/2015 | Kano |
| 9,110,864 | B2 | 8/2015 | Jamjoom et al. |
| 9,137,052 | B2 | 9/2015 | Koponen et al. |
| 9,166,988 | B1 | 10/2015 | Shin et al. |
| 9,231,871 | B2 | 1/2016 | Mehta et al. |
| 9,270,521 | B2 | 2/2016 | Tompkins |
| 9,282,027 | B1 | 3/2016 | Brandwine et al. |
| 9,317,469 | B2 | 4/2016 | Gross et al. |
| 9,349,135 | B2 | 5/2016 | Sarshar |
| 9,374,337 | B2 | 6/2016 | Rangaraman et al. |
| 9,391,859 | B2 | 7/2016 | Huang et al. |
| 9,401,818 | B2 | 7/2016 | Venkatesh |
| 9,450,862 | B2 | 9/2016 | Chen et al. |
| 9,497,281 | B2 | 11/2016 | Jagadish et al. |
| 9,825,810 | B2 | 11/2017 | Jain et al. |
| 9,866,473 | B2 | 1/2018 | Parsa et al. |
| 9,876,714 | B2 | 1/2018 | Parsa et al. |
| 10,044,617 | B2 | 8/2018 | Parsa et al. |
| 10,390,290 | B1 | 8/2019 | Zhang et al. |
| 10,454,758 | B2 * | 10/2019 | Boutros .............. H04L 12/4641 |
| 10,951,584 | B2 | 3/2021 | Kancherla et al. |
| 11,153,122 | B2 | 10/2021 | Dubey et al. |
| 11,296,984 | B2 | 4/2022 | Kancherla et al. |
| 11,533,255 | B2 | 12/2022 | Parsa et al. |
| 11,539,574 | B2 * | 12/2022 | Boutros ................ H04L 45/586 |
| 11,570,092 | B2 | 1/2023 | Kancherla et al. |
| 2003/0093481 | A1 | 5/2003 | Mitchell et al. |
| 2003/0154399 | A1 | 8/2003 | Zuk et al. |
| 2004/0018839 | A1 | 1/2004 | Andric et al. |
| 2004/0197079 | A1 | 10/2004 | Latvala et al. |
| 2005/0063324 | A1 | 3/2005 | O'Neill et al. |
| 2005/0220098 | A1 | 10/2005 | Oguchi et al. |
| 2006/0176882 | A1 | 8/2006 | Schein et al. |
| 2006/0193247 | A1 | 8/2006 | Naseh et al. |
| 2006/0193252 | A1 | 8/2006 | Naseh et al. |
| 2007/0061492 | A1 | 3/2007 | Riel |
| 2007/0180226 | A1 | 8/2007 | Schory et al. |
| 2007/0201357 | A1 | 8/2007 | Smethurst et al. |
| 2008/0072305 | A1 | 3/2008 | Casado et al. |
| 2008/0098113 | A1 | 4/2008 | Hansen et al. |
| 2008/0259938 | A1 | 10/2008 | Keene et al. |
| 2009/0016354 | A1 | 1/2009 | Isobe |
| 2009/0097406 | A1 | 4/2009 | Nilakantan et al. |
| 2009/0129271 | A1 | 5/2009 | Ramankutty et al. |
| 2009/0161573 | A1 * | 6/2009 | Takase .................. H04L 41/142 370/252 |
| 2009/0193122 | A1 | 7/2009 | Krishamurthy |
| 2009/0199268 | A1 | 8/2009 | Ahmavaara et al. |
| 2009/0235325 | A1 | 9/2009 | Dimitrakos et al. |
| 2010/0046530 | A1 | 2/2010 | Hautakorpi et al. |
| 2010/0097931 | A1 | 4/2010 | Mustafa |
| 2010/0100616 | A1 | 4/2010 | Bryson et al. |
| 2010/0271964 | A1 | 10/2010 | Akhter et al. |
| 2010/0302940 | A1 | 12/2010 | Patel et al. |
| 2011/0013639 | A1 | 1/2011 | Matthews et al. |
| 2011/0026537 | A1 | 2/2011 | Kolhi et al. |
| 2011/0213888 | A1 | 9/2011 | Goldman et al. |
| 2012/0106560 | A1 | 5/2012 | Gumaste |
| 2012/0131216 | A1 | 5/2012 | Jain et al. |
| 2012/0216282 | A1 | 8/2012 | Pappu et al. |
| 2012/0250682 | A1 | 10/2012 | Vincent et al. |
| 2012/0258712 | A1 | 10/2012 | Rozinov |
| 2013/0007740 | A1 | 1/2013 | Kikuchi et al. |
| 2013/0073743 | A1 | 3/2013 | Ramasamy et al. |
| 2013/0121209 | A1 | 5/2013 | Padmanabhan et al. |
| 2013/0155902 | A1 | 6/2013 | Feng et al. |
| 2013/0163594 | A1 | 6/2013 | Sharma et al. |
| 2013/0174177 | A1 | 7/2013 | Newton et al. |
| 2013/0201989 | A1 | 8/2013 | Hu et al. |
| 2013/0227550 | A1 | 8/2013 | Weinstein et al. |
| 2013/0239198 | A1 | 9/2013 | Niemi et al. |
| 2013/0254085 | A1 | 9/2013 | Tanimoto et al. |
| 2013/0329584 | A1 | 12/2013 | Ghose et al. |
| 2013/0332983 | A1 | 12/2013 | Koorevaar et al. |
| 2013/0336337 | A1 | 12/2013 | Gopinath et al. |
| 2014/0050091 | A1 | 2/2014 | Biswas et al. |
| 2014/0068602 | A1 | 3/2014 | Gember et al. |
| 2014/0092906 | A1 | 4/2014 | Kandaswamy et al. |
| 2014/0115578 | A1 | 4/2014 | Cooper et al. |
| 2014/0195666 | A1 | 7/2014 | Dumitriu et al. |
| 2014/0198649 | A1 | 7/2014 | Jain et al. |
| 2014/0269733 | A1 | 9/2014 | Venkatesh |
| 2014/0297964 | A1 | 10/2014 | Nakase |
| 2014/0301388 | A1 | 10/2014 | Jagadish et al. |
| 2014/0304399 | A1 | 10/2014 | Chaudhary et al. |
| 2014/0310418 | A1 | 10/2014 | Sorenson, III et al. |
| 2014/0323127 | A1 | 10/2014 | Evans et al. |
| 2014/0380087 | A1 | 12/2014 | Jamjoom et al. |
| 2015/0106420 | A1 | 4/2015 | Warfield et al. |
| 2015/0146539 | A1 | 5/2015 | Mehta et al. |
| 2015/0263899 | A1 | 9/2015 | Tubaltsev et al. |
| 2015/0281042 | A1 | 10/2015 | Agarwal et al. |
| 2015/0312155 | A1 | 10/2015 | Anand et al. |
| 2016/0006654 | A1 | 1/2016 | Fernando et al. |
| 2016/0028630 | A1 | 1/2016 | Wells |
| 2016/0028855 | A1 | 1/2016 | Goyal et al. |
| 2016/0043901 | A1 | 2/2016 | Sankar et al. |
| 2016/0065479 | A1 | 3/2016 | Harper et al. |
| 2016/0080261 | A1 | 3/2016 | Koponen et al. |
| 2016/0119229 | A1 | 4/2016 | Zhou |
| 2016/0119236 | A1 | 4/2016 | DeCusatis et al. |
| 2016/0142295 | A1 | 5/2016 | Parsa et al. |
| 2016/0142296 | A1 | 5/2016 | Parsa et al. |
| 2016/0142297 | A1 | 5/2016 | Parsa et al. |
| 2016/0142314 | A1 | 5/2016 | Parsa et al. |
| 2016/0226700 | A1 | 8/2016 | Zhang et al. |
| 2016/0241669 | A1 | 8/2016 | Royon et al. |
| 2016/0308770 | A1 | 10/2016 | Zhang et al. |
| 2016/0315049 | A1 | 10/2016 | Thirumurthi et al. |
| 2016/0350151 | A1 * | 12/2016 | Zou ........................ H04L 67/61 |
| 2017/0048136 | A1 | 2/2017 | Williams |
| 2017/0085486 | A1 | 3/2017 | Chung et al. |
| 2017/0150418 | A1 | 5/2017 | Kim et al. |
| 2017/0195169 | A1 | 7/2017 | Mills et al. |
| 2017/0257801 | A1 | 9/2017 | Toth et al. |
| 2018/0248805 | A1 | 8/2018 | Kamat et al. |

(56) References Cited

U.S. PATENT DOCUMENTS

| | | | |
|---|---|---|---|
| 2018/0278541 | A1 | 9/2018 | Wu et al. |
| 2019/0021029 | A1 | 1/2019 | Rydnell et al. |
| 2019/0036815 | A1 | 1/2019 | Kancherla et al. |
| 2019/0036819 | A1 | 1/2019 | Kancherla et al. |
| 2019/0036881 | A1 | 1/2019 | Kancherla et al. |
| 2019/0260610 | A1 | 8/2019 | Dubey et al. |
| 2019/0268421 | A1* | 8/2019 | Markuze ............... H04L 67/10 |
| 2020/0204603 | A1* | 6/2020 | Upadhyaya ............ H04L 65/80 |
| 2020/0412826 | A1* | 12/2020 | Levy Nahum ........ H04L 67/142 |
| 2021/0014733 | A1* | 1/2021 | Soliman ............... H04M 15/64 |
| 2022/0103476 | A1* | 3/2022 | Sun ....................... H04L 45/745 |
| 2022/0345439 | A1* | 10/2022 | Wheelock ........... H04L 61/5014 |
| 2023/0124797 | A1 | 4/2023 | Parsa et al. |

FOREIGN PATENT DOCUMENTS

| | | |
|---|---|---|
| CN | 103647656 A | 3/2014 |
| CN | 103701900 A | 4/2014 |
| CN | 103930882 A | 7/2014 |
| CN | 104022891 A | 9/2014 |
| CN | 104011687 B | 9/2017 |
| EP | 1890438 A1 | 2/2008 |
| WO | 2008095010 A1 | 8/2008 |
| WO | 2016076900 A1 | 5/2016 |

OTHER PUBLICATIONS

Noferi et al., "Deployment and configuration of MEC apps with Simu5g", Department of Information Engineering, University of Pisa, Sep. 24, 2021.*

Jung et al,. "Integrated Management of Network Address Translateion, Mobility, and Security on the Blockchain Control Plane", Dec. 21, 2019.*

Piccolo et al., "A Survey of Network Isolation Solutions for Multi-Tenant Data Centers", IEEE Communication Surveys & Tutorials, (vol. 18, Issue 4, pp. 2787-2821, Oct. 2016.*

Krylov et al., "The convoluted multiaddress networking architecture principles and application", 120-15 Fourth International Conference on Future Generation Communication Technology, Jul. 2015.*

Comer et al., "DCnet" A new data cneter network architecture, IEEE 7th Annual Computing and Communication Workshop and Conference, Jan. 9, 2017, IEEE Publishing.*

Author Unknown, "Enabling Service Chaining on Cisco Nexus 1000V Series," Month Unknown, 2012, 25 pages, CISCO.

Aversa, Luis, et al., "Load Balancing a Cluster of Web Servers Using Distributed Packet Rewriting," Computer Science Department Technical Report, Jan. 6, 1999, 13 pages, Boston University, Boston, MA, USA.

Dixon, Colin, et al., "An End to the Middle," Proceedings of the 12th Conference on Hot Topics in Operating Systems, May 2009, 5 pages, USENIX Association, Berkeley, CA, USA.

Guichard, J., et al., "Network Service Chaining Problem Statement," Network Working Group, Jun. 13, 2013, 14 pages, Cisco Systems, Inc.

Harper, Matthew H., et al., (U.S. Appl. No. 62/042,049), filed Aug. 26, 2014, 27 pages.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Koponen, Teemu, et al., "Network Virtualization in Multi-tenant Datacenters," Technical Report TR-2013-001E, Aug. 2013, 22 pages, VMware, Inc., Palo Alto, CA, USA.

Non-Published commonly owned U.S. Appl. No. 17/571,409, filed Jan. 7, 2022, 40 pages, VMware, Inc.

Schroeder, Trevor, et al., "Scalable Web Server Clustering Technologies," IEEE Network, vol. 14, No. 3, May 1, 2000, 8 pages, IEEE Service Center, New York, NY, USA.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

* cited by examiner

ANYCAST ADDRESS FOR NETWORK ADDRESS TRANSLATION AT EDGE

BACKGROUND

Logical networks implemented in datacenters often include gateways implemented on edge nodes that provide services to data traffic sent between the logical network and external networks. If these services are stateful, the gateways have typically been implemented in an active-standby configuration such that only one of the edge nodes is active at a time. In this configuration, traffic originating from the logical network and traffic originating from the external network is all sent to the same active edge node. The state can be synchronized to a backup node in case of failover. However, the single active edge node can be a bottleneck, so an active-active configuration in which traffic is split among the multiple active edge nodes is especially preferable for networks with a large amount of such "north-south" traffic.

BRIEF SUMMARY

Some embodiments provide a method for performing stateful source network address translation (NAT) at a set of edge nodes that implement a logical router gateway for processing data messages between a logical network and an external network in an active-active configuration. The edge nodes share an anycast network address (e.g., a public IP address) for the NAT, rather than each having their own network address into which source network addresses of outgoing (egress) data messages (and thus destination network addresses of incoming data messages) are translated. That is, when any of the edge nodes receives an outgoing data message sent from a source data compute node (e.g., a virtual machine, container, etc.) in the logical network to an external destination, that edge node translates the source address of the data message into the anycast network address and sends out the data message to the external network. This avoids the need to partition a network address pool between the edge nodes, which may be especially difficult if the active-active edge node cluster scales in and out (i.e., changing the number of edge nodes un the active-active cluster).

When the edge nodes receive incoming (ingress) data messages from the external network in response to the outgoing messages, data messages for many different flows will all be directed to the same anycast network address. To differentiate the data message flows so that reverse SNAT can be performed properly, some embodiments modify the source transport layer port number of the data message in addition to the source network address when processing the outgoing data messages. Thus, for an incoming data message, the recipient edge node can use the destination port number as well as the source network address (of the external entity) to identify the data message flow to which the incoming data message belongs and perform reverse SNAT correctly.

In the active-active configuration of some embodiments, data messages are sent from the logical network to the edge nodes using an ECMP algorithm such that the data messages of a data message flow in one direction may not be sent to the same edge node as the data messages of the data message flow in the other direction. Return traffic may also be sent from the external network to the edge nodes using a different ECMP algorithm in some embodiments. In other embodiments, different edge nodes have connectivity to different external routers and each external router sends traffic to a nearest edge node (e.g., using administrative distance values to determine priority). Each of the edge nodes has an uplink interface with which the anycast network address is associated and responds to address resolution protocol (ARP) requests for the anycast network address with its respective media access control (MAC) address (so that incoming traffic for the anycast network address can be routed to each of the edge nodes).

In such a scenario, the edge nodes use a deterministic algorithm (e.g., a consistent hashing algorithm) to select a respective one of the edge nodes to perform stateful processing (including SNAT and reverse SNAT) for each respective data message flow (and forward the data message to the selected edge node for stateful processing). The deterministic algorithm is such that the same edge node is selected for data messages in both directions for a data message flow even if those data messages are initially sent to two different edge nodes (e.g., by hashing or otherwise using the destination network address for egress data messages sent from the logical network and hashing or otherwise using the source network address for ingress data messages sent from the external network).

Thus, even with all of the edge nodes using the same SNAT network address, the return ingress traffic can be differentiated based on the source network address and redirected to the same edge node that performed SNAT on the outgoing traffic. As such, an incoming data messages can be matched to a stateful entry for the data message flow at the edge node that performs stateful processing (based on a connection 5-tuple that includes the destination transport layer port number) and the SNAT network address translated into the correct logical network address. Similarly, subsequent egress data messages are also redirected to the same edge node and the stateful entry used to translate the source network address and port number.

Given this, it is important that an edge node avoid using the same source port number for two simultaneously-active data message flows. In some embodiments, a network management and control system divides the available port numbers and allocates each of the edge nodes a mutually exclusive port number range. In this case, if one of the nodes fails or a new node is added, the port number ranges are re-allocated.

On the other hand, because each data message flow is redirected between the edge nodes based on the external network address, some embodiments forego the port number range allocation and allow each of the edge nodes to use the entire available range of port numbers supported by the transport layer protocol (typically up to 64000 for TCP or UDP). Because any two data message flows having the same external network address will be redirected to the same edge node, that edge node can guarantee that the same port number is not used for these two data message flows without any further coordination between the edge nodes. This technique has the advantage of requiring less coordination by the network management system and avoiding the need to reallocate port numbers during failover or cluster scaling.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for performing stateful source network address translation (NAT) at a set of edge nodes that implement a logical router gateway for processing data messages between a logical network and an external network in an active-active configuration. The edge nodes share an anycast network address (e.g., a public IP address) for the NAT, rather than each having their own network address into which source network addresses of outgoing (egress) data messages (and thus destination network addresses of incoming data messages) are translated. That is, when any of the edge nodes receives an outgoing data message sent from a source data compute node (e.g., a virtual machine, container, etc.) in the logical network to an external destination, that edge node translates the source network address of the data message into the anycast network address and sends out the data message to the external network. This avoids the need to partition a network address pool between the edge nodes, which may be especially difficult if the active-active edge node cluster scales in and out (i.e., changing the number of edge nodes un the active-active cluster).

When the edge nodes receive incoming (ingress) data messages from the external network in response to the outgoing messages, data messages for many different flows will all be directed to the same anycast network address. To differentiate the data message flows so that reverse SNAT can be performed properly, some embodiments modify the source transport layer port number of the data message in addition to the source network address when processing the outgoing data messages. Thus, for an incoming data message, the recipient edge node can use the destination port number as well as the source network address (of the external entity) to identify the data message flow to which the incoming data message belongs and perform reverse SNAT correctly.

Figure 1:
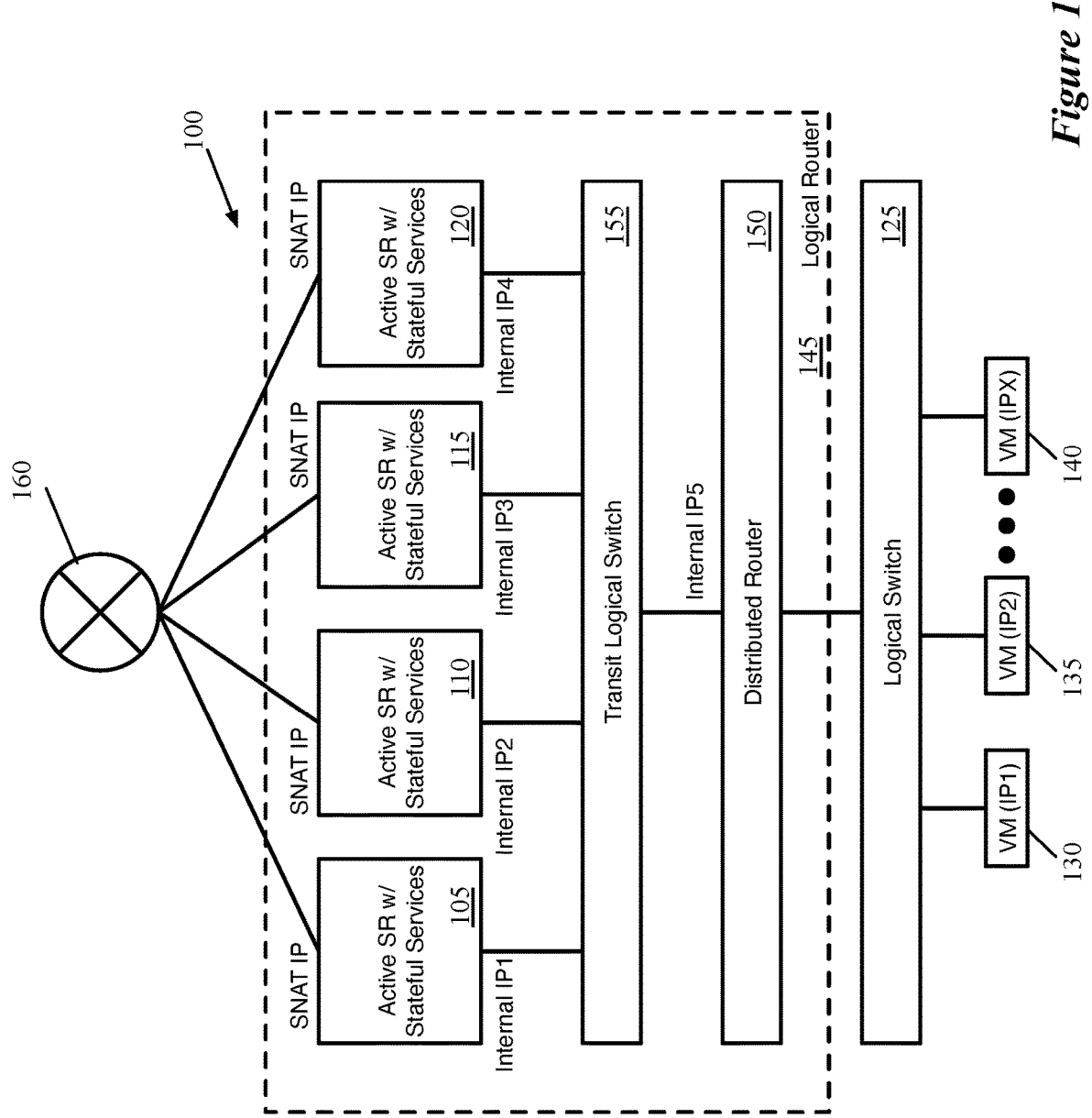
FIG. 1 conceptually illustrates a logical network of some embodiments with multiple centralized routers that share an anycast SNAT IP address.

FIG. 1 conceptually illustrates such a logical network 100 of some embodiments with multiple centralized routers 105-120 that share an anycast SNAT IP address. As shown, the logical network 100 includes a logical switch 125 to which a set of VMs 130-140 connect as well as a logical router 145 that provides a connection to external networks for the logical network 100. It should be understood that the logical networks of some embodiments may include various logical network elements defined between the logical network endpoint data compute nodes (e.g., the VMs 130-140, containers, etc.) and the logical router that provides the connection between external networks and the logical network (which may be referred to as a tier-0, or T0, router). Such a logical network may include numerous logical switches to which different logical network endpoint data compute nodes (DCNs) as well as numerous logical routers (also referred to as tier-1, or T1 routers) interposed between the T0 logical router and the logical switches in order to segregate different groups of logical switches from each other. The logical network 100 shown in FIG. 1, however, only includes a single logical switch 125 without any T1 logical routers, for the sake of simplicity.

The logical router 145 includes a distributed router (DR) 150, a transit logical switch 155, and the set of centralized routers 105-120 (also referred to as service routers, or SRs). In some embodiments, a user defines the logical router (e.g., through a network management and control system API) and specifies a number of uplinks and/or a number of SRs. The network management and control system then defines the various routing components (the DR, SRs, and transit logical switch for connecting these components) based on this input. In this case, the SRs 105-120 are defined as being implemented in active-active configuration (rather than active-standby, in which only a single one of the SRs would perform process traffic while the others would act as backups in case of failover). The logical routers of some embodiments are described in further detail in U.S. Pat. No. 9,787,605 and U.S. Patent Publication 2021/0314192, both of which are incorporated herein by reference.

As shown, the VMs 130-140 each have their own IP addresses IP1-IPX, which are often private IP addresses. Within the logical router 145, internal IP addresses are assigned to the northbound interface of the DR as well as the downlinks of the SRs. In some embodiments, these IP addresses are all on the same internal subnet. The uplinks of the SRs, in some embodiments, all use the same anycast SNAT IP address (e.g., a public IP address). By using an anycast IP address, there is no worry about connections being terminated or a need to hand off IP addresses during failover. The uplinks are all connected to an external router 160. In some embodiments, as here, all of the uplinks connect to the same router or set of routers. In other embodiments, different uplinks may have different connectivity to external networks.

Figure 2:
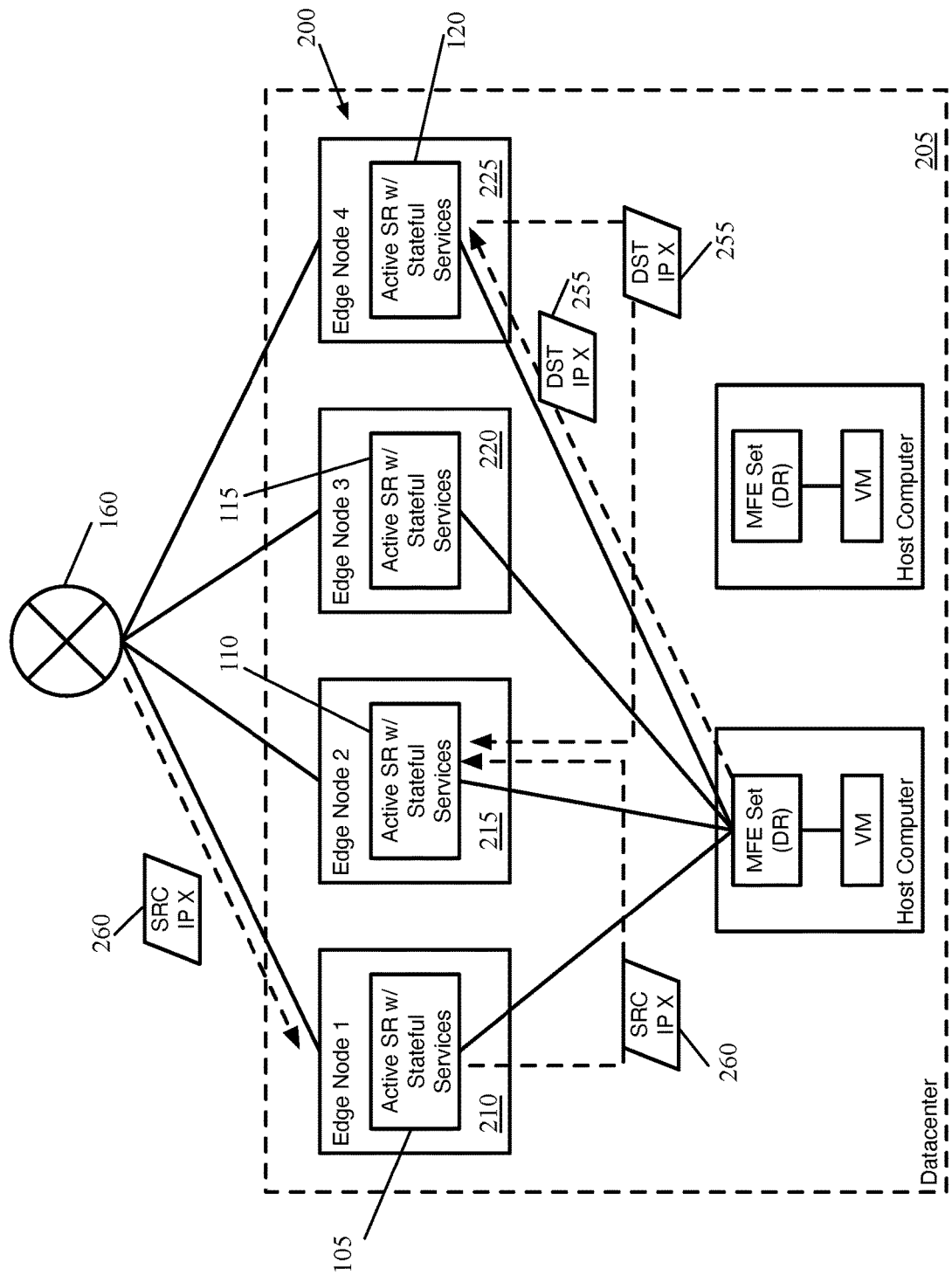
FIG. 2 conceptually illustrates an edge cluster implementing the SRs of FIG. 1 operating in active-active configuration in a datacenter.

FIG. 2 conceptually illustrates an edge cluster 200 implementing the SRs 105-120 operating in active-active configuration in a datacenter 205. It should be noted that while this example shows an active-active edge cluster for a logical network implemented in a single datacenter, in other embodiments the logical network and/or edge cluster is stretched across multiple datacenters (e.g., at different geographic locations). In some embodiments, the logical network is stretched across multiple datacenters with an active-active edge cluster operating in each of these datacenters (or at least a subset of the datacenters). In some such embodiments, each active-active edge cluster operates in the manner described herein.

As shown, the edge cluster 200 includes four edge nodes 210-225, each of which implements a centralized logical router gateway (one of the SRs) that provides stateful services. Each of the edge nodes 210-225 may be a physical edge device or a virtualized DCN (e.g., a VM, etc.). Each SR 105-120 is implemented on a single edge node (or, in some cases, on a pair of edge nodes in active-standby configuration). In some embodiments, the logical router is configured with multiple uplinks connecting the logical network to external networks and a separate SR is implemented (on a separate edge node) for each uplink. The DR 150 is implemented across numerous host computers that also implement the logical switch 125 (and in other examples, other logical switches and/or logical routers) as well as the centralized edge nodes that implement the SRs.

As mentioned, each of the edge nodes 210-225 in the edge cluster 200 implements a separate SR 105-120 that performs stateful services for data messages sent to and from the logical network. These stateful services may include network address translation (NAT), stateful firewall operations (e.g., that use connection tracking), as well as other services. Each data message (or at least many of the data messages) sent from the logical network in the datacenter 205 to an external network, or vice versa, has these stateful services applied by one of the edge nodes 210-225. In addition, although described in terms of implementing an SR for a particular logical network, the edge nodes of some embodiments may implement multiple different SRs for one or more logical networks.

In this example, a physical network router 160 (e.g., a top of rack (TOR) switch or router) sends data messages from external networks (e.g., data messages originating from completely separate logical networks in other datacenters, personal devices contacting an application or web server located in the datacenter 205, etc.) to the edge cluster 200 using a first equal-cost multi-path (ECMP) algorithm. In the other direction, managed forwarding element (MFE) sets executing on host computers (e.g., virtual routers and/or virtual switches executing in the virtualization software of the host computers) implement the DR 150 as well as the logical switch 125. The implementation of the DR, in some embodiments, specifies a second ECMP algorithm for sending data messages directed to external addresses to the edge cluster 200. These two different ECMP algorithms (the first of which the datacenter and/or logical network administrator may not have any control over) may be different such that the data messages of a data message flow in one direction are not always sent to the same edge node as the data messages of the data message flow in the other direction.

For instance, a first data message 255 is sent from a host computer 260 to the fourth edge node 225. However, a second data message 260 (belonging to the same data message flow as the first data message 255, though addressed to the anycast SNAT IP shared among the uplinks of the SRs 105-120) is sent from the external physical network router 160 to the first edge node 210. In this scenario, each of the edge nodes 210-225 uses the same deterministic algorithm (e.g., a hash function) to select one of the edge nodes to perform stateful processing for each data message flow and forward the data messages to the selected edge nodes for stateful processing and forwarding. The deterministic algorithm is such that the same edge node is selected for data messages in both directions for a data message flow even if those data messages are initially sent to two different edge nodes. For instance, some embodiments hash or otherwise use the destination network address for northbound data messages sent from the logical network and hash or otherwise use the source network address for southbound data messages sent from the external network.

Thus, in the example, the fourth edge node 225 computes a hash based on the destination IP X of the first data message 255. Based on this hash and an algorithm for mapping the hash to an edge node, the fourth edge node 225 forwards the first data message 255 to the second edge node 215. Upon receiving the second data message 260, the first edge node 210 computes a hash based on the source IP X of the data message (using the same hash function as used by the fourth edge node 225). Based on this hash and the algorithm for mapping the hash to an edge node (also the same across all of the edge nodes), the first edge node 210 forwards the second data message 260 to the second edge node 215. This allows the second edge node 215 to keep connection state for the data message flow and perform stateful services (e.g., SNAT and reverse SNAT) on data messages sent in both directions for the data message flow. In some embodiments, the external network address (e.g., the source address for incoming data messages and the destination address for outgoing data messages) is used for the hash because this address is not subject to NAT and thus will be a constant for both directions of the data message flow. In addition, whereas a logical network address may be the same across many data message flows (and thus the use of such a logical network address could result in overloading a single edge node of the cluster), this is less likely to be the case for an external network address.

As noted, each of the edge nodes in the edge cluster receives data traffic directed to the same anycast SNAT IP address from the external network. In some embodiments, to attract this traffic, each of the edge nodes sends routing protocol messages (e.g., BGP messages) to the external network router or routers advertising themselves as a route for data messages directed to the anycast SNAT IP address. The external routers use ECMP if, as in the example shown in FIG. 2, each of the edge nodes is an equal distance away. In other cases, the external routers use typical routing (e.g., with priority determined by administrative distance) to identify a destination edge node for data messages directed to the SNAT IP address. In addition, each of the edge nodes responds to address resolution protocol (ARP) requests for the anycast network address with its respective media access control (MAC) address so that incoming traffic for the anycast network address can be routed to each of the edge nodes. That is, although the edge node uplink interfaces share the same anycast SNAT IP address, they each have their own separate MAC address.

Figure 3:
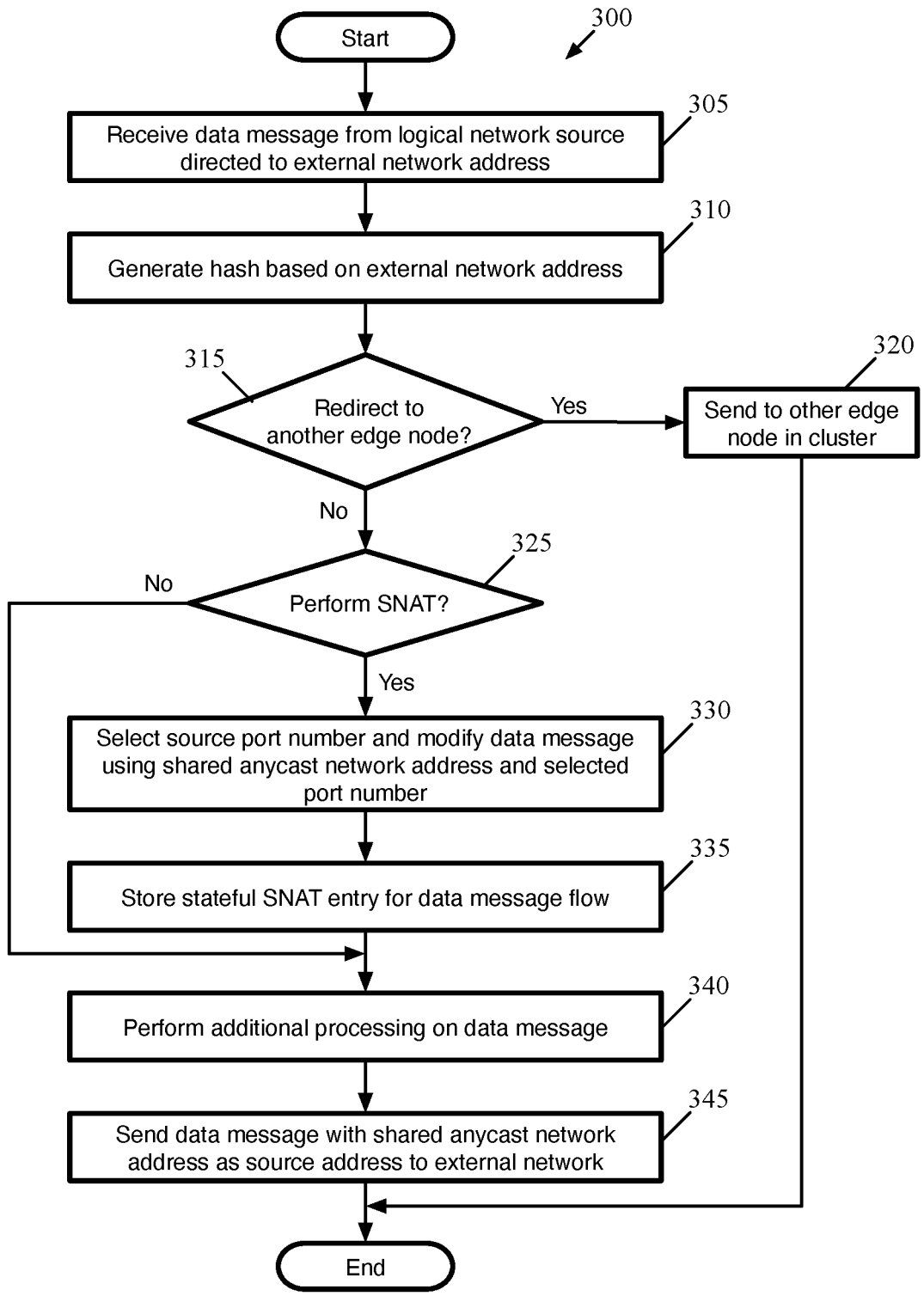
FIG. 3 conceptually illustrates a process of some embodiments for performing SNAT on a data message at an edge node that uses an anycast SNAT IP address.

FIG. 3 conceptually illustrates a process 300 of some embodiments for performing SNAT on a data message at an edge node that uses an anycast SNAT IP address (e.g., one of the edge nodes shown in FIG. 2). In some embodiments, the process 300 is performed by a datapath (e.g., a DPDK-based datapath) executing on the edge node. The process 300 will be described in part by reference to FIG. 4, which conceptually illustrates an example of an edge node performing SNAT on a data message sent from a logical network endpoint source machine.

As shown, the process 300 begins by receiving (at 305) a data message from a logical network source that is directed to an external network address. In many cases, the edge nodes only receive data messages that are sent between the logical network and external networks, as other logical network data messages are fully processed at the MFE sets in the datacenter without requiring processing at the edge node. In other cases, edge nodes may also perform centralized services for T1 logical routers of the logical network, in which case the edge nodes can also receive such intra-logical network traffic. Consideration of such traffic is not described in the process 300, which assumes that the data message is directed to an external network address. In some embodiments, the edge node receives such data messages via a logical switch (identified using a virtual network identifier in an encapsulation header) that indicates the data message is intended for processing by the T0 SR.

Figure 4:
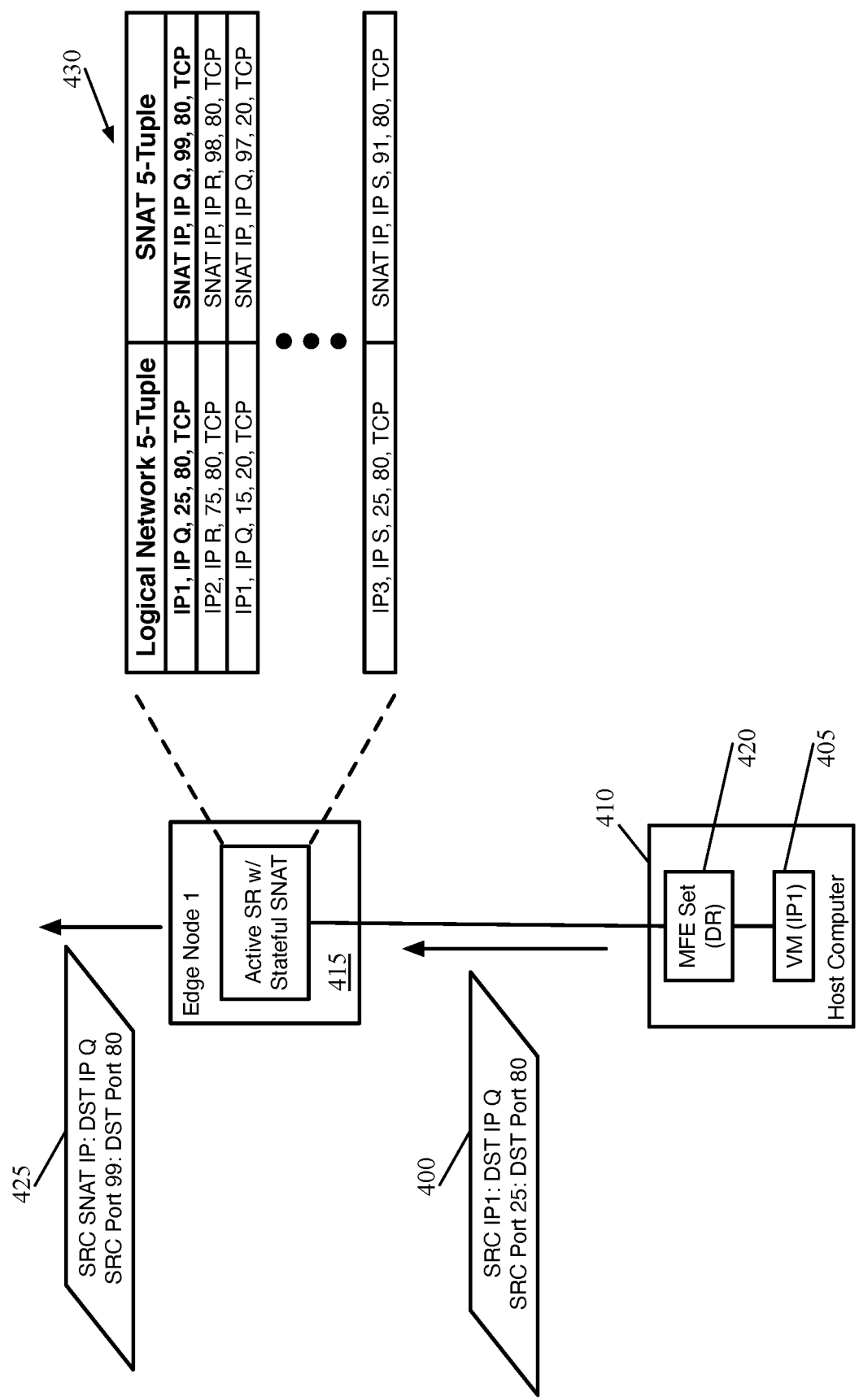
FIG. 4 conceptually illustrates an example of an edge node performing SNAT on a data message sent from a logical network endpoint source machine.

FIG. 4 shows that a VM 405, residing on a host computer 410, has sent a data message 400 that has been forwarded to an edge node 415. The data message 405 is processed by an MFE set 420 at the host computer, which performs logical switching and/or routing to determine that the data message 405 should be directed to one of multiple edge nodes for a T0 logical router because the destination IP address of the data message is external to the logical network. As shown, the data message 400 has a source IP address IP1 (the IP address of the VM 405) and a destination IP address Q (an external network address). In addition, the source port number of the data message 400 is 25 and the destination port number is 80 (e.g., for http traffic). Though not shown in the figure, in some embodiments the MFE set 420 encapsulates the data message 400 to send the data message to the edge node 415.

The process 300 generates (at 310) a hash based on the external network address of the data message. As described above, hashing based on the external network address (the destination address for data messages received from the logical network and the source network address for data messages received from the external network) ensures that all data messages for both directions of a given data message flow are processed by the same edge node.

The process 300 then determines (at 315) whether to redirect the data message to another edge node. If the data message should be redirected, then the process 300 sends (at 320) the data message to another edge node in the cluster. Some embodiments use a typical algorithm that computes the hash value modulo the number of edge nodes in the cluster to identify which edge node should process each data message. Other embodiments use a consistent hashing mechanism such as the one described in U.S. patent application Ser. No. 17/571,409, which is incorporated herein by reference, to identify which edge node should process a data message. If the data message is redirected, then that other edge node will receive the data message and perform operations 325-345.

If the data message is processed at the recipient edge node, the process 300 determines (at 325) whether to perform SNAT on the data message. In some embodiments, the edge nodes are configured (based on logical router configuration data provided to the network management system by an administrator) to perform SNAT only on data messages from certain logical network endpoints (e.g., endpoints connected to only a subset of the logical switches of the logical network). If no SNAT needs to be performed, the process proceeds to operation 340, described below.

Otherwise, if SNAT is to be used, the process 300 selects (at 330) a source port number and modifies the data message by replacing (i) the source logical network address with a shared anycast network address (e.g., a public network address) and (ii) the source port number with the selected source port number. This shared anycast IP address is used for all SNAT operations at both the edge node performing the process 300 and any other edge nodes in the cluster. It should be noted that the shared anycast IP address is specific to the SR that is implemented across the edge node cluster, and if some or all of those edge nodes implement other T0 SRs for other logical networks, they may use different SNAT IP addresses for the other logical networks (e.g., different anycast IP addresses).

The process 300 also stores (at 335) a stateful NAT entry for the data message flow to which the data message belongs. It should be noted that this process assumes that the data message is the first data message of a data message flow (e.g., a SYN packet of a TCP three-way handshake), and thus such an entry does not already exist for the data message flow that can be used to modify the data message. The port number translation enables the SNAT operation to be stateful, so that (i) incoming return data messages can be translated back to the correct internal logical network address and (ii) subsequent outgoing data messages belonging to the data message flow are translated in the same manner. For later outgoing data messages, the source port number does not need to be selected as this information can be looked up in the stateful NAT entry for the data message flow.

Even though all of the edge nodes use the same SNAT network address and thus the return ingress traffic may be directed from the external network to any of them, the return ingress traffic for a given data flow is differentiated based on the source (external) network address and redirected to the same edge node that performed SNAT on the initial outgoing data message. As such, an incoming data messages can be matched to a stateful entry for the data message flow at the edge node that performs stateful processing (based on a connection 5-tuple that includes the destination transport layer port number) and the SNAT network address translated into the correct logical network address. Similarly, subsequent egress data messages are also redirected to the same edge node and the stateful entry used to translate the source network address and port number.

Given this, it is important that an edge node avoid using the same source port number for two simultaneously-active data message flows. In some embodiments, a network management and control system divides the available port numbers and allocates each of the edge nodes a mutually exclusive port number range. In this case, if one of the nodes fails or a new node is added, the port number ranges are re-allocated. When selecting a source port number for the initial outgoing data message of a data message flow, the process 300 selects a port number within the allocated range, guaranteed that there will not be any overlap with port numbers selected for flows by other edge nodes.

On the other hand, because each data message flow is redirected between the edge nodes based on the external network address, some embodiments forego the port number range allocation and allow each of the edge nodes to use the entire available range of port numbers supported by the transport layer protocol (typically up to 64000 for TCP or UDP). Because any two data message flows having the same external network address will be redirected to the same edge node, that edge node can guarantee that the same port number is not used for these two data message flows without any further coordination between the edge nodes. This technique has the advantage of requiring less coordination by the network management system and avoiding the need to reallocate port numbers during failover or cluster scaling. Each edge node is still responsible in this situation for avoiding (to the extent possible) reusing the same port number for multiple simultaneous connections. Some embodiments allow reuse (e.g., if there are more than 64000 simultaneous connections) so long as the external network addresses are different, so that the data message flows can still be differentiated by the edge node.

In FIG. 4, the edge node 415 receives the data message 400 and performs SNAT on the data message 400 as part of the implementation of the SR for the logical network to which the VM 405 belongs. As shown by the modified data message 425 that is sent to the external network, the source IP address has been changed to the SNAT IP address and the source port number has been changed to 99. The destination IP address and port number are unchanged. In addition, the edge node 415 stores a new entry for this data message flow in a table 430 of SNAT entries. In some embodiments, as shown, each SNAT entry maps a logical network 5-tuple (source and destination IP address, source and destination transport layer port number, transport protocol) to an SNAT 5-tuple. As shown by this example, a single logical network address might have multiple ongoing connections to external endpoints, including multiple connections to the same endpoint (e.g., on different port numbers for different services). In addition, two different logical network endpoints might use the same source port number when sending data message to external endpoints (whether those endpoints are the same or different). The SNAT 5-tuples all use the same IP address, and thus this is not a differentiator between flows. However, the source port numbers are all unique between these flows because the edge node 415 has selected them to ensure this uniqueness.

Returning to FIG. 3, the process 300 next performs (at 340) additional processing on the data message. Finally, the process 300 sends (at 345) the data message with the shared anycast network address as its source address to the external network, then ends. It should be noted that the process 300 is a conceptual process. In some embodiments, at least some of the additional processing is actually performed prior to the SNAT operations. This additional processing can include firewall operations or other stateful services as well as forwarding operations. For instance, the SR configuration specifies routing operations for the data message which result in forwarding the data message to the external network.

Figure 5:
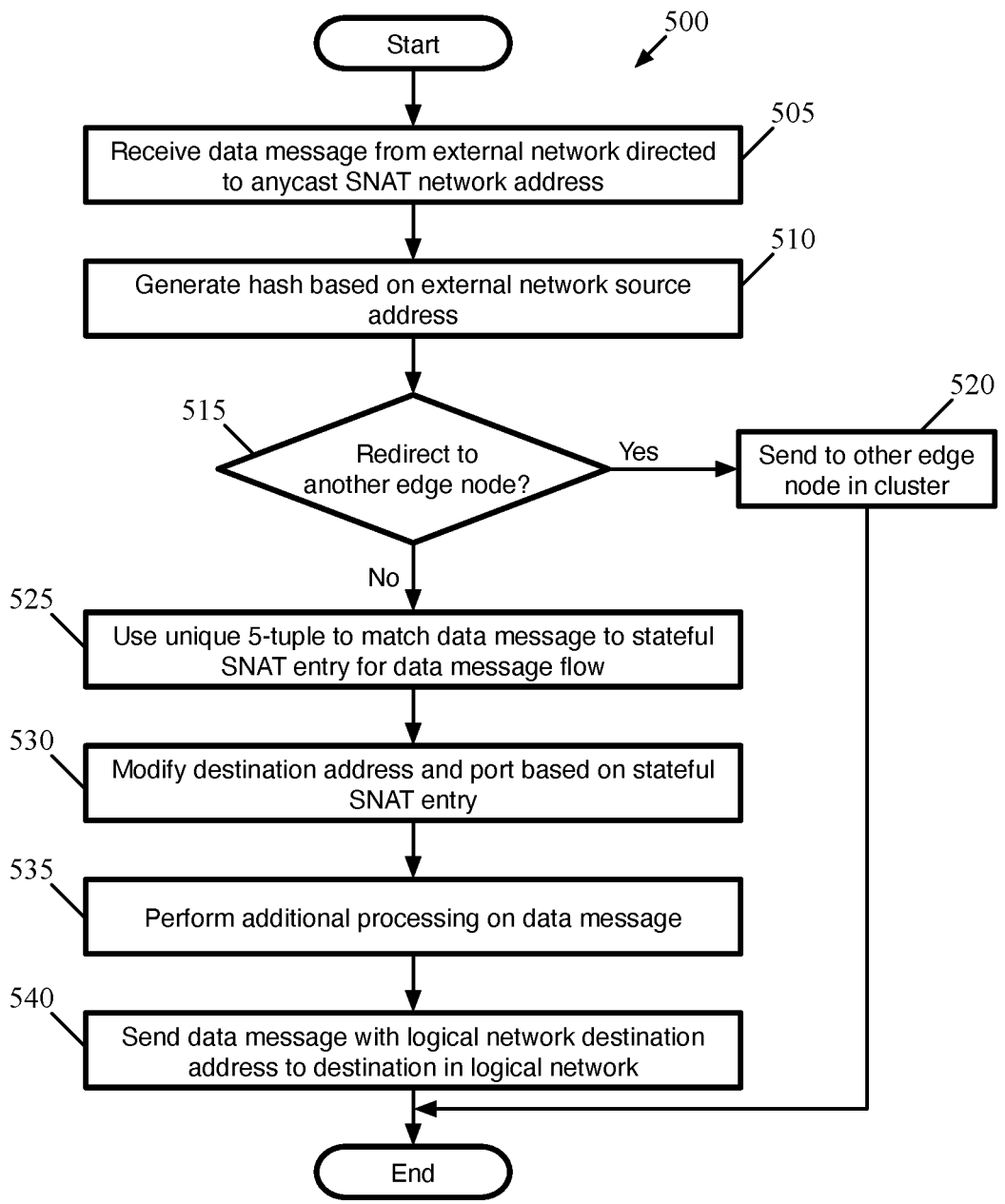
FIG. 5 conceptually illustrates a process of some embodiments for performing reverse SNAT on a data message at an edge node that uses an anycast SNAT IP address.

FIG. 5 conceptually illustrates a process 500 of some embodiments for performing reverse SNAT on a data message at an edge node that uses an anycast SNAT IP address (e.g., one of the edge nodes shown in FIG. 2). In some embodiments, the process 500 is performed by a datapath (e.g., a DPDK-based datapath) executing on the edge node. The process 500 will be described in part by reference to FIG. 6, which conceptually illustrates an example of an edge node performing reverse SNAT on a data message sent from an external network in response to the data message shown in FIG. 4.

As shown, the process 500 begins by receiving (at 505) a data message from an external network that is directed to the anycast SNAT network address. In some embodiments, the edge node receives this data message at an uplink interface that connects to one or more physical network routers (e.g., that connects to a TOR via a virtual local area network (VLAN)). The data message, in some embodiments, belongs to a connection initiated by a logical network source endpoint.

Figure 6:
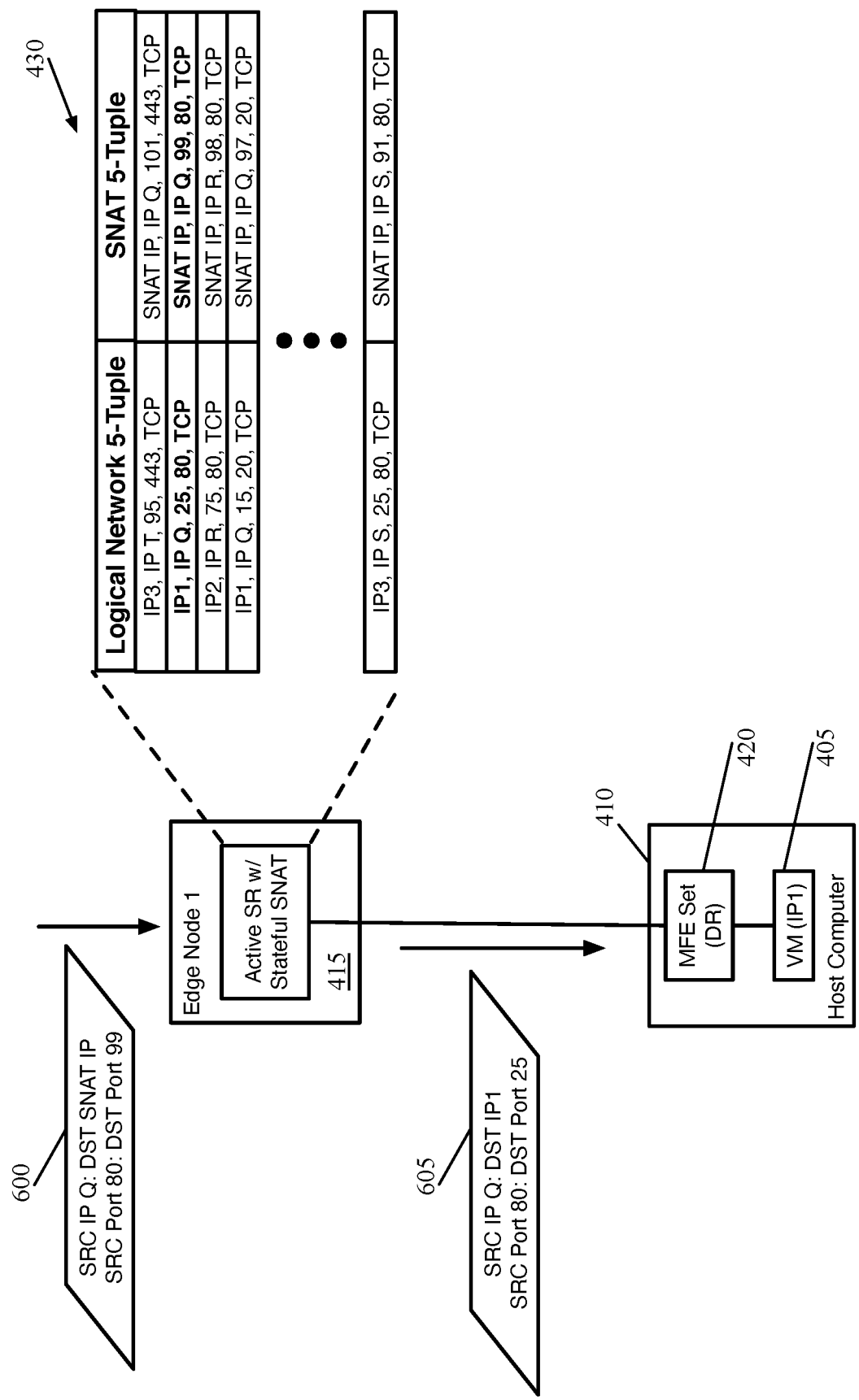
FIG. 6 conceptually illustrates an example of an edge node performing reverse SNAT on a data message sent from an external network in response to the data message shown in FIG. 4.

FIG. 6 shows that the edge node 415 receives a data message 600 from the external network. An external network router (not shown) selects the edge node 415 from among the edge nodes in its cluster based on the destination IP address being the SNAT IP address (e.g., using ECMP or because the edge node 415 is the highest priority edge node at that router for the SNAT IP address) and forwards the data message 600 to the edge node 415. This data message 600 is sent from the same external network endpoint (with IP address Q) as that to which the data message 400 was directed.

The process 500 generates (at 510) a hash based on the external network source address of the data message. As described above, hashing based on the external network address (the destination address for data messages received from the logical network and the source network address for data messages received from the external network) ensures that all data messages for both directions of a given data message flow are processed by the same edge node.

The process 500 then determines (at 515) whether to redirect the data message to another edge node. If the data message should be redirected, then the process 500 sends (at 520) the data message to another edge node in the cluster. As described above, some embodiments use a typical algorithm that computes the hash value modulo the number of edge nodes in the cluster to identify which edge node should process each data message. Other embodiments use a consistent hashing mechanism such as the one described in U.S. patent application Ser. No. 17/571,409, which is incorporated by reference above, to identify which edge node should process a data message. If the data message is redirected, then that other edge node will receive the data message and perform operations 525-540.

If the data message is to be processed at the recipient edge node, the process 500 uses (at 525) a unique 5-tuple (or other identification) of the data message to match the data message to a stateful SNAT entry for the data message flow to which the data message belongs. As described, while the destination network address is the same for all of the data messages received for any flows on which SNAT is performed, the source (external) network address as well as the source and destination port numbers can be used to differentiate the flows.

The process 500 then modifies (at 530) the destination address and port number based on the identified stateful SNAT entry for the data message flow. In FIG. 6, the edge node 415 receives the data message 600 and performs a lookup in the SNAT table 430 to identify a matching entry. The entry shown in bold is identified based on the source (external) IP address Q as well as the source port number 80 and destination port number 99 of the data message 600. Using the entry, the edge node modifies the data message 600 to change the destination network address to be the logical network IP1 and the destination port number to be 25, as per the logical network 5-tuple of the matching table entry. The edge node then sends this modified data message 605 to the MFE set 420 on the host computer 410 (e.g., as an encapsulated data message) based on logically forwarding the data message.

The process 500 also performs (at 535) additional processing on the data message. Finally, the process 500 sends (at 540) the data message with the logical network destination address to its destination in the logical network, then ends. It should be noted that the process 500 is a conceptual process. In some embodiments, at least some of the additional processing is actually performed prior to the reverse SNAT operations. This additional processing can include firewall operations or other stateful services. In addition, the SR configuration specifies logical forwarding operations (which occur after the reverse SNAT operations, as they are based on the logical network destination address). In some embodiments, the edge node datapath is configured to perform first-hop logical processing on incoming data messages. In this case, the edge node performs all of the logical forwarding for the data message, including logical switching for the logical switch to which the destination of the data message connects. Based on this logical switching, the edge node encapsulates the data message and sends the encapsulated data message to the host computer on which the destination logical network endpoint executes.

As mentioned, by allowing each of the edge nodes in the cluster to use the full range of source port number, any need for coordination between the edge nodes regarding source port allocation is removed. This can result in the data messages sent to the external network from two different edge nodes having the same IP address (the SNAT address) and source port number, because the destination IP address is guaranteed to be different.

Figure 7:
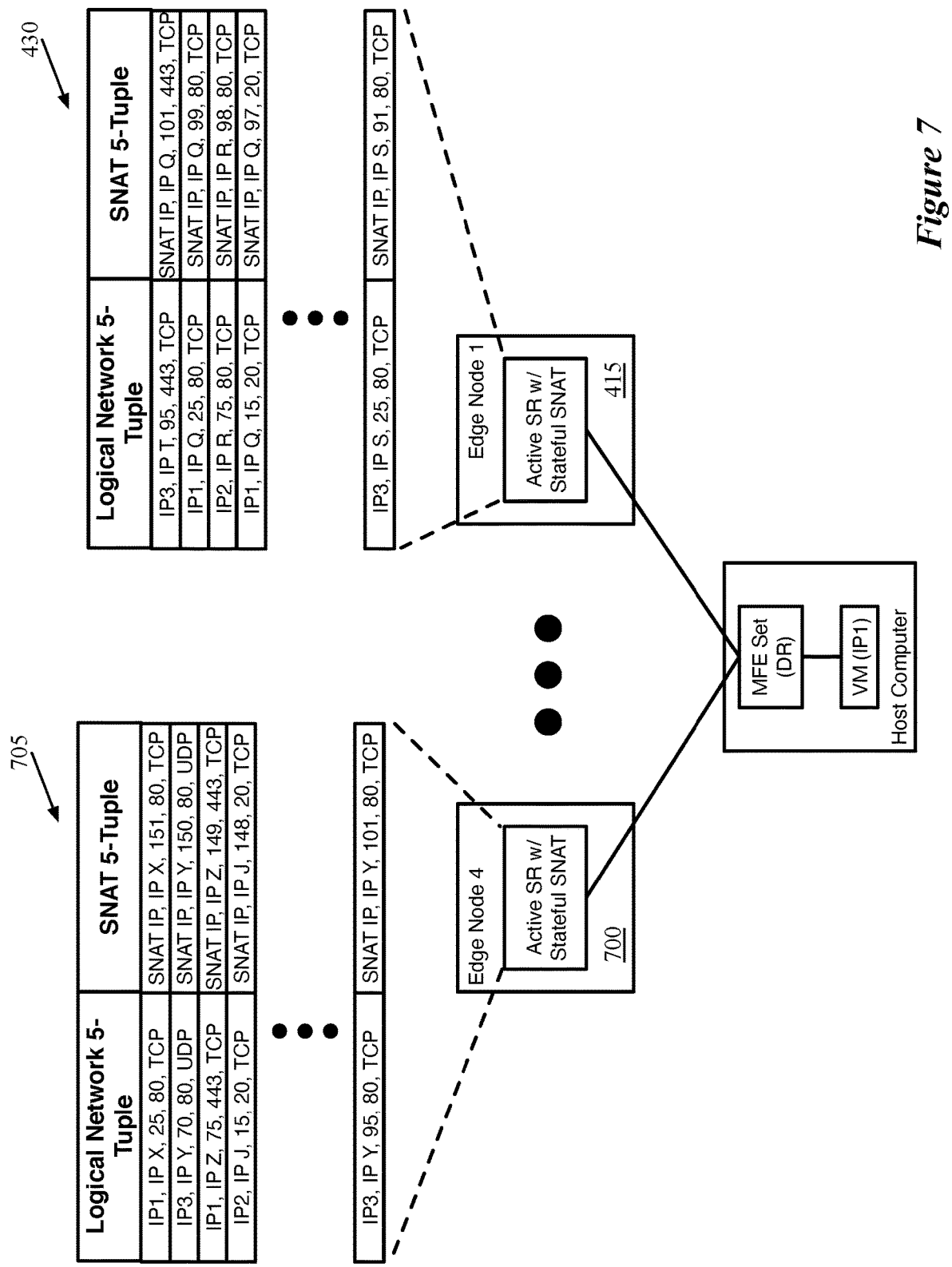
FIG. 7 conceptually illustrates the SNAT connection tables at multiple edge nodes in a cluster that implement SRs for the same logical router.

FIG. 7 conceptually illustrates the SNAT connection tables 430 and 705 at multiple edge nodes 415 and 700 in a cluster that implement SRs for the same logical router. The first edge node 415 stores the same connection table 430 shown in FIG. 6, while another edge node 700 in the same cluster stores its own SNAT connection table 700. The SNAT connection table 700 maps logical network 5-tuples to SNAT 5-tuples. In this case, the external IP addresses are guaranteed to be different from those in the first connection table 415 because the first edge node 415 and the fourth edge node 700 do not process traffic for the same external IP address based on the redirection algorithm. As such, even though both SNAT tables include an entry that has the same source IP address (the SNAT IP) and source port number (101), there is a guarantee that the external destination addresses will be different (in this case, IP Y and IP Q).

In some embodiments, as shown, each SNAT entry maps a logical network 5-tuple (source and destination IP address, source and destination transport layer port number, transport protocol) to an SNAT 5-tuple. As shown by this example, a single logical network address might have multiple ongoing connections to external endpoints, including multiple connections to the same endpoint (e.g., on different port numbers for different services). In addition, two different logical network endpoints might use the same source port number when sending data message to external endpoints (whether those endpoints are the same or different). The SNAT 5-tuples all use the same IP address, and thus this is not a differentiator between flows. However, the source port numbers are all unique between these flows because the edge node 415 has selected them to ensure this uniqueness.

Figure 8:
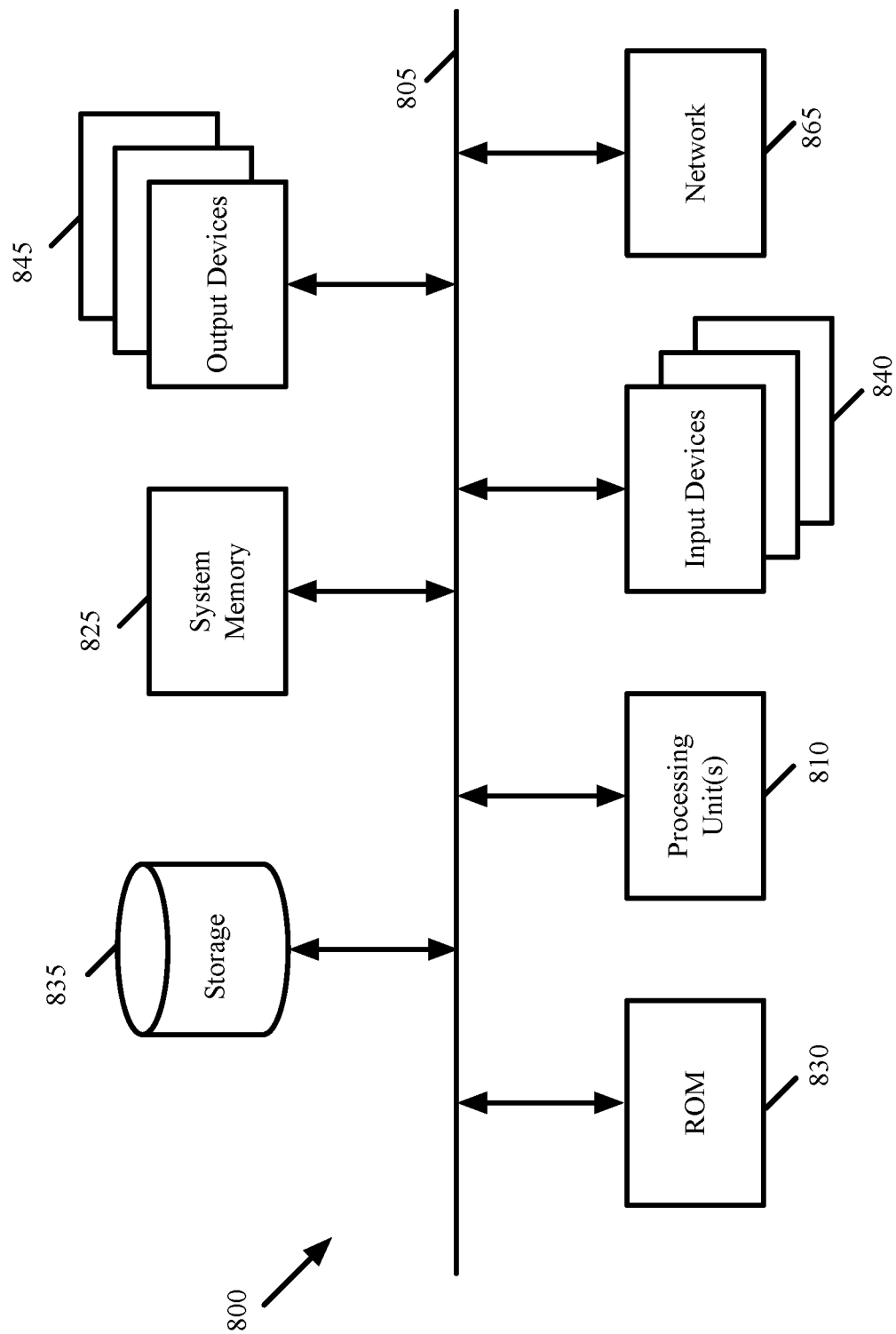
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding data messages at a plurality of edge nodes of a logical network that process data messages between a logical network and an external network, the method comprising:
    at a particular one of the edge nodes, receiving a data message sent from a source machine in the logical network;
    performing network address translation to translate a source network address of the data message corresponding to the source machine into an anycast network address that is shared among the plurality of edge nodes; and
    sending the data message with the anycast network address to the external network, wherein each edge node in the plurality of edge nodes receives data messages from source machines in the logical network and translates the source addresses of the data messages into the same anycast public network address prior to sending the data messages to the external network;
    wherein the external network routes data messages having the anycast network address as a destination network address to a nearest one of the edge nodes.

2. The method of claim 1, wherein performing network address translation comprises modifying a source transport layer port number of the data message.

3. The method of claim 2, wherein each of the edge nodes uses a full available range of transport layer port numbers for network address translation.

4. The method of claim 3, wherein:
    the edge nodes use a deterministic algorithm to select a respective one of the edge nodes to perform network address translation for each respective data message received at the edge nodes; and
    the deterministic algorithm is based on (i) a respective destination network address for each respective data message received from the logical network and (ii) a respective source network address for each respective data message received from the external network such that network address translation for each data message of a particular data message flow is performed by a same first edge node and network address translation for two different data message flows to a same external network address is performed by a same second edge node.

5. The method of claim 4, wherein the data message is a first data message, the method further comprising:
receiving a second data message sent from the source machine in the logical network; and
redirecting the second data message to a different one of the edge nodes based on a destination network address of the second data message.

6. The method of claim 2, wherein:
each of the edge nodes is allocated a subset of an available range of source port numbers;
and modifying the source port number of the data message comprises using a source port number in the range allocated to the particular edge node.

7. The method of claim 1, wherein the source machine in the logical network is one of a virtual machine (VM) and a container.

8. The method of claim 1, wherein the anycast network address is a public network address.

9. The method of claim 1, wherein each respective edge node comprises a respective uplink interface with which the anycast network address is associated.

10. The method of claim 9, wherein:
each of the respective uplink interfaces has a different respective associated media access control (MAC) address; and
each of the edge nodes responds to address resolution protocol (ARP) requests for the anycast network address with the respective associated MAC address.

11. The method of claim 1, wherein the nearest one of the edge nodes is an edge node having a highest priority.

12. The method of claim 1 further comprising advertising the anycast network address to an external network router using a routing protocol message.

13. The method of claim 1, wherein the external network comprises a router that uses equal-cost multi-path (ECMP) routing to select one of the edge nodes for data messages having the anycast network address as a destination network address.

14. A non-transitory machine-readable medium storing a program which when executed by at least one processing unit forwards data messages at a particular edge node of a plurality of edge nodes of a logical network that process data messages between a logical network and an external network, the program comprising:
receiving a data message sent from a source machine in the logical network;
performing network address translation to translate a source network address of the data message corresponding to the source machine into an anycast network address that is shared among the plurality of edge nodes; and
sending the data message with the anycast network address to the external network, wherein each edge node in the plurality of edge nodes receives data messages from source machines in the logical network and translates the source addresses of the data messages into the same anycast public network address prior to sending the data messages to the external network;
wherein:
the set of instructions for performing network address translation comprises a set of instructions for modifying a source transport layer port number of the data message; and
each of the edge nodes uses a full available range of transport layer port numbers for network address translation.

15. The non-transitory machine-readable medium of claim 14, wherein:
the edge nodes use a deterministic algorithm to select a respective one of the edge nodes to perform network address translation for each respective data message received at the edge nodes; and
the deterministic algorithm is based on (i) a respective destination network address for each respective data message received from the logical network and (ii) a respective source network address for each respective data message received from the external network such that network address translation for each data message of a particular data message flow is performed by a same first edge node and network address translation for two different data message flows to a same external network address is performed by a same second edge node.

16. The non-transitory machine-readable medium of claim 15, wherein the data message is a first data message, the program further comprising sets of instructions for:
receiving a second data message sent from the source machine in the logical network; and
redirecting the second data message to a different one of the edge nodes based on a destination network address of the second data message.

17. The non-transitory machine-readable medium of claim 14, wherein the anycast network address is a public network address.

18. The non-transitory machine-readable medium of claim 14, wherein:
each respective edge node comprises a respective uplink interface with which the anycast network address is associated,
each of the respective uplink interfaces has a different respective associated media access control (MAC) address; and
each of the edge nodes responds to address resolution protocol (ARP) requests for the anycast network address with the respective associated MAC address.

19. The non-transitory machine-readable medium of claim 14, wherein the external network routes data messages having the anycast network address as a destination network address to a nearest one of the edge nodes.

20. The non-transitory machine-readable medium of claim 14, wherein the program further comprises a set of instructions for advertising the anycast network address to an external network router using a routing protocol message.

21. The non-transitory machine-readable medium of claim 14, wherein the external network comprises a router that uses equal-cost multi-path (ECMP) routing to select one of the edge nodes for data messages having the anycast network address as a destination network address.

* * * * *